(No Model.) 9 Sheets—Sheet 1.
H. W. SOUDER.
TYPE WRITING MACHINE.
No. 580,014. Patented Apr. 6, 1897.
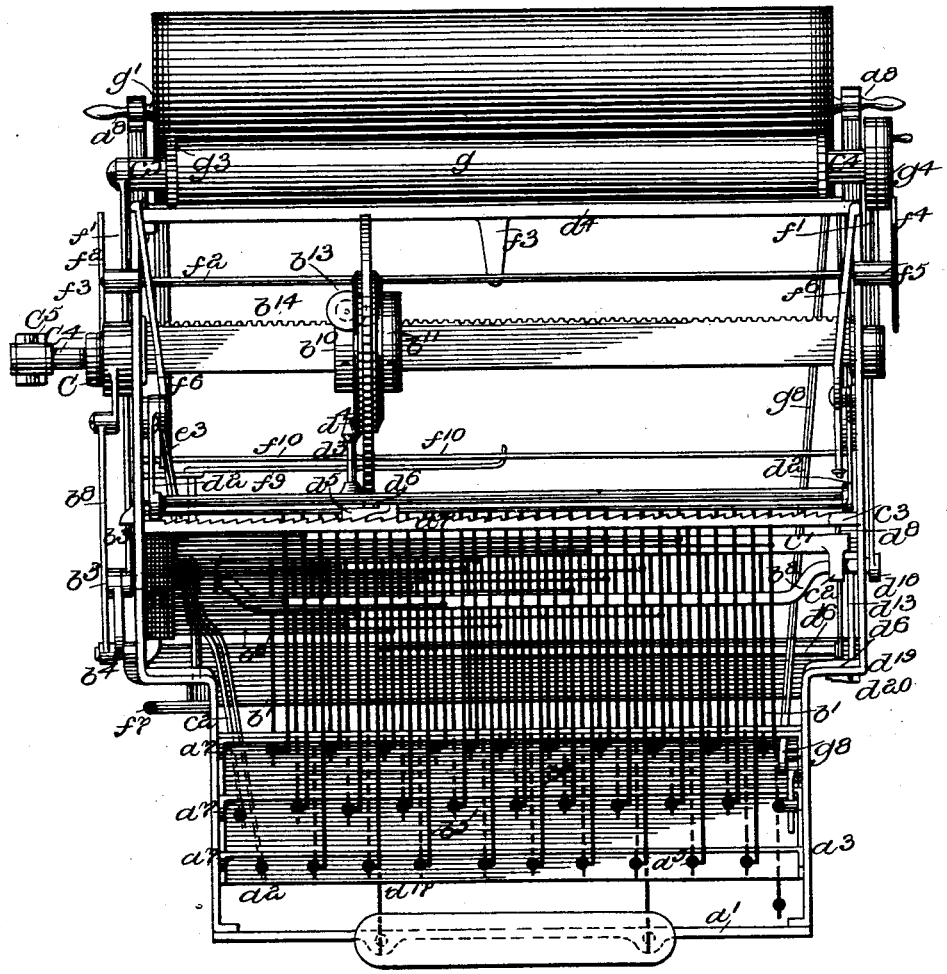
Fig. 1.
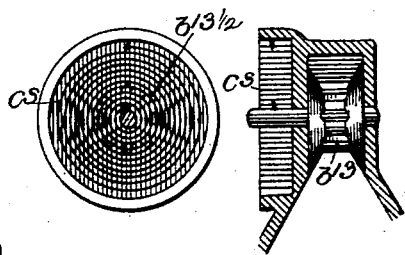
Fig. 4ᵈ.
WITNESSES
Arthur Ashley
Horace A. Dodge
INVENTOR
Howell W. Souder (No Model.) 9 Sheets—Sheet 2.
H. W. SOUDER.
TYPE WRITING MACHINE.
No. 580,014. Patented Apr. 6, 1897.
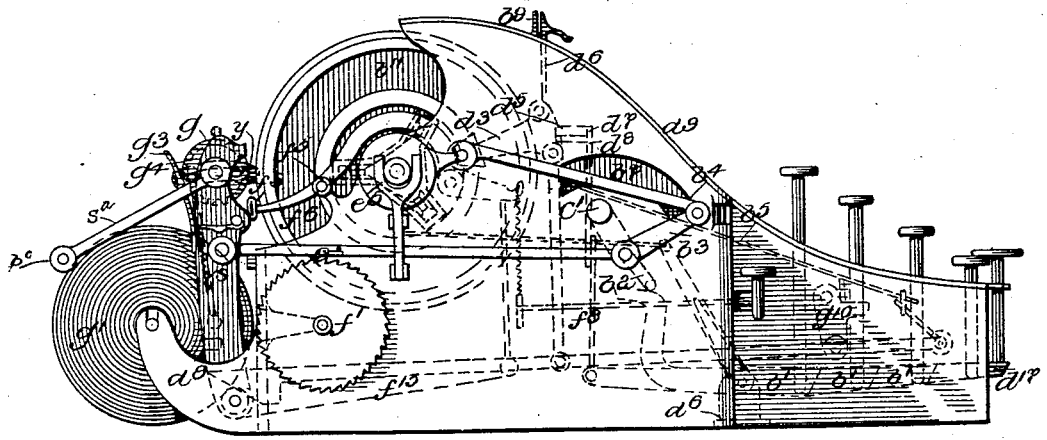
WITNESSES
Arthur Ashley
Horace A. Dodge
INVENTOR
Howell W. Souder (No Model.)  9 Sheets—Sheet 3.
H. W. SOUDER.
TYPE WRITING MACHINE.
No. 580,014.  Patented Apr. 6, 1897.
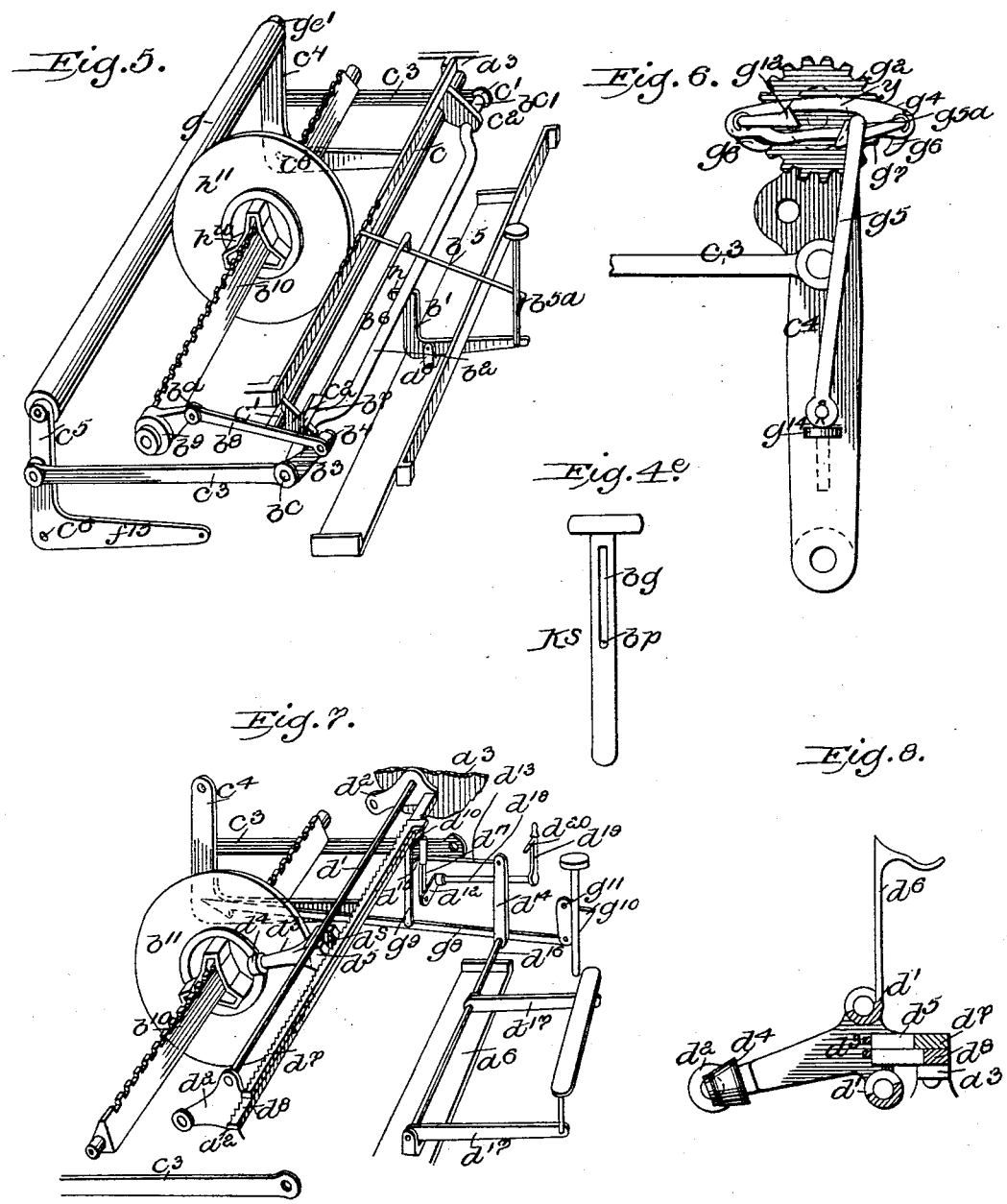
WITNESSES
Arthur Ashley
Horace A. Dodge.
INVENTOR
Howell W. Souder
by  Attorney (No Model.) 9 Sheets—Sheet 4.

H. W. SOUDER.
TYPE WRITING MACHINE.

No. 580,014. Patented Apr. 6, 1897.

WITNESSES
Arthur Ashley
Horace A. Dodge.

INVENTOR
Howell W. Souder
by [signature] Attorney (No Model.)  9 Sheets—Sheet 5.

H. W. SOUDER.
TYPE WRITING MACHINE.

No. 580,014.  Patented Apr. 6, 1897.

WITNESSES
Arthur Ashley
Horace A. Dodge.

INVENTOR
Howell W. Souder
by [signature] Attorney

THE NORRIS PETERS CO., PHOTO-LITHO., WASHINGTON, D. C.

Figure 7E:
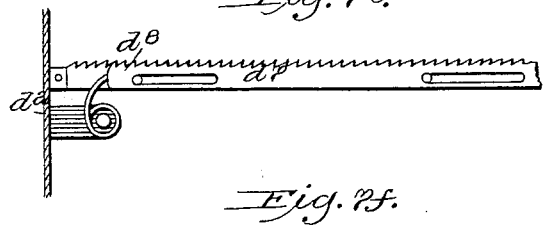
Figure 7F:
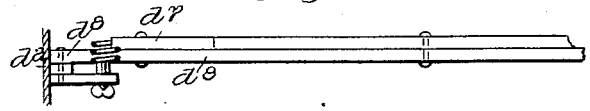
Figure 7G:
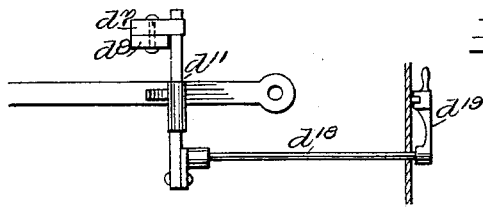
Figure 7H:
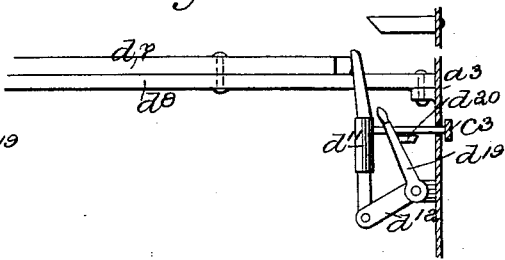

(No Model.) 9 Sheets—Sheet 6.
H. W. SOUDER.
TYPE WRITING MACHINE.
No. 580,014. Patented Apr. 6, 1897.
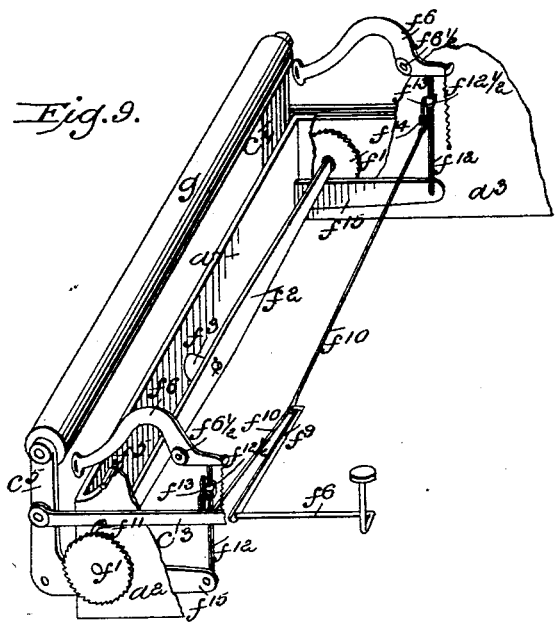
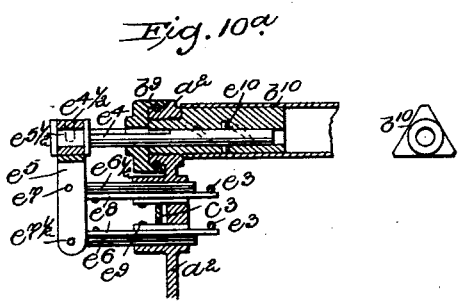
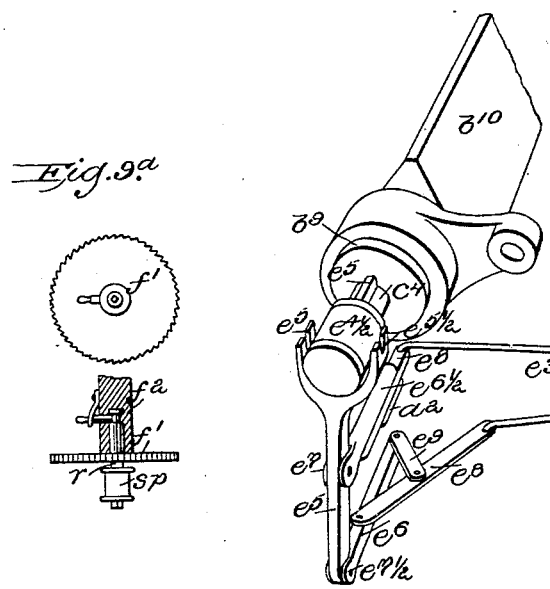
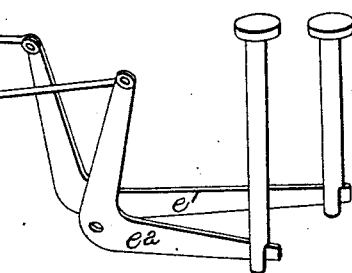
WITNESSES
Arthur Ashley
Horace A. Dodge.
INVENTOR
Howell W. Souder:
by [signature] Attorney (No Model.) 9 Sheets—Sheet 7.
H. W. SOUDER.
TYPE WRITING MACHINE.
No. 580,014. Patented Apr. 6, 1897.
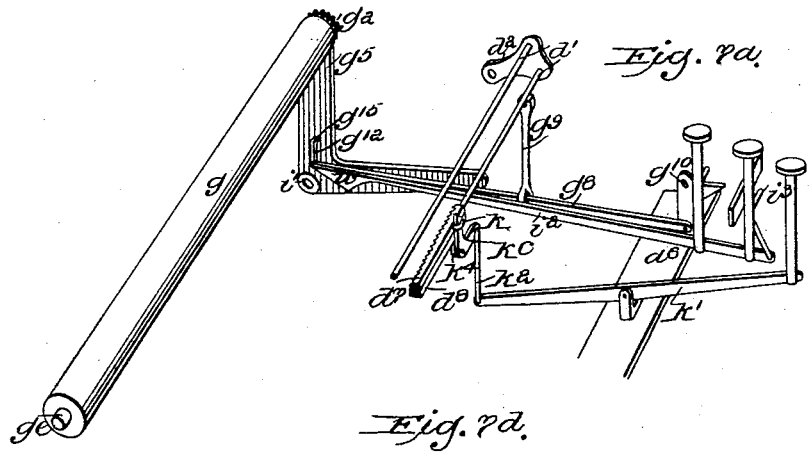
Fig. 7a.
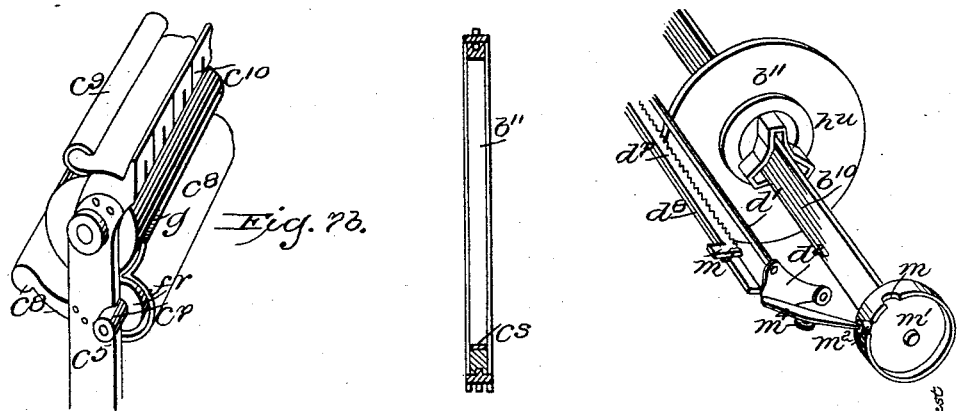
Fig. 7b.  Fig. 11.
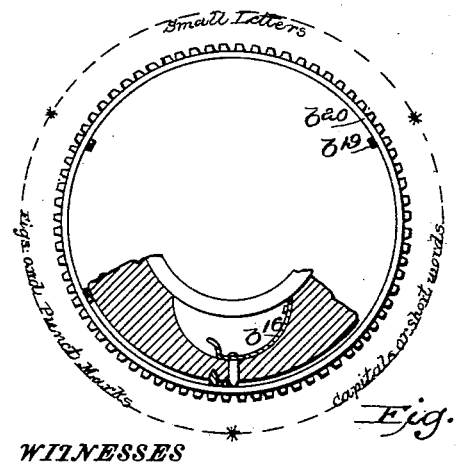
Fig. 40.
WITNESSES
Arthur Ashley
Horace A. Dodge.
INVENTOR
Howell W. Souder
by  Attorney (No Model.) 9 Sheets—Sheet 8.

H. W. SOUDER.
TYPE WRITING MACHINE.

No. 580,014. Patented Apr. 6, 1897.

WITNESSES
Arthur Ashley
Horace A. Dodge

INVENTOR
Howell W. Souder
by [signature] atty (No Model.)

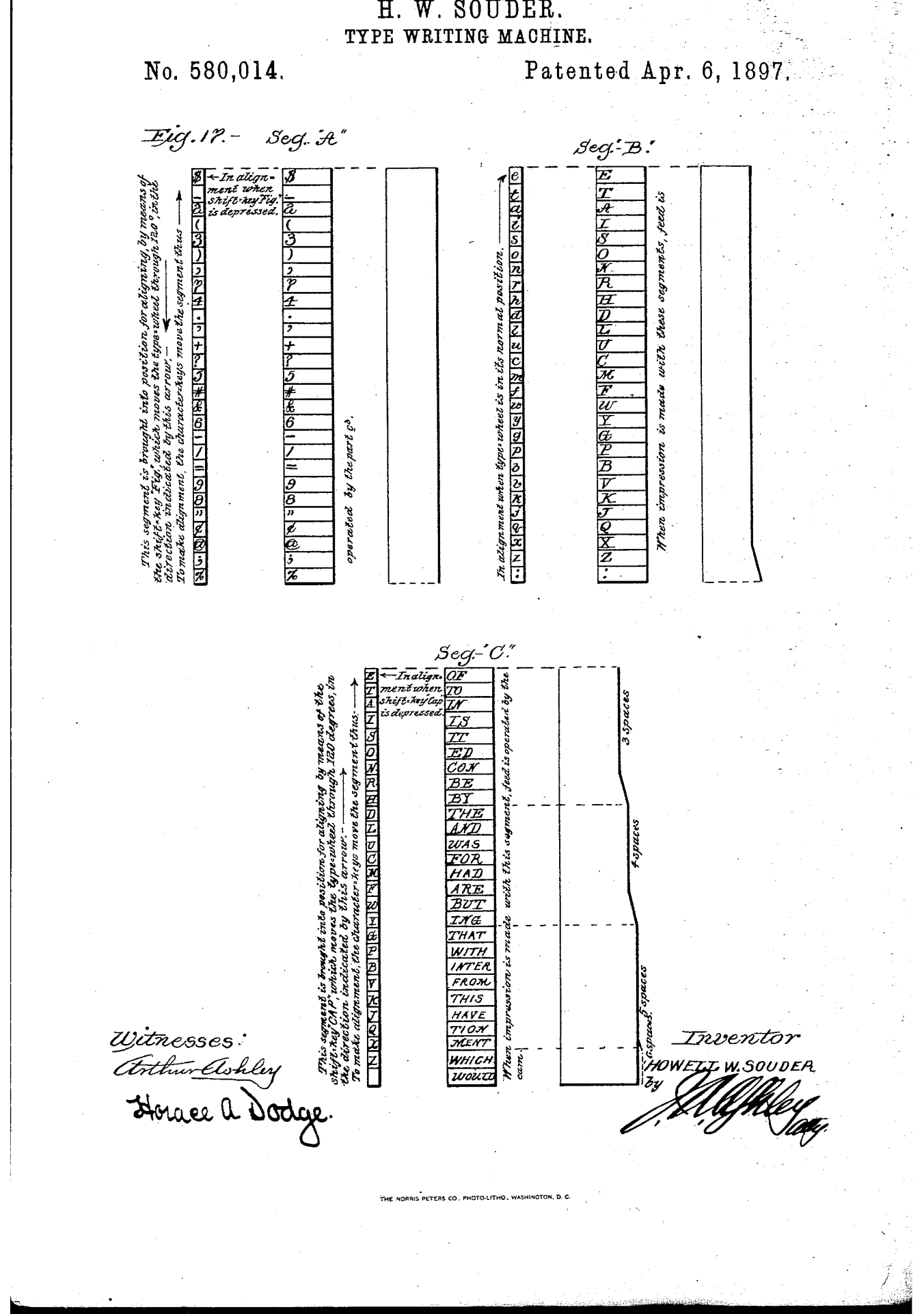

H. W. SOUDER.
TYPE WRITING MACHINE.

No. 580,014. Patented Apr. 6, 1897.

*Fig. 17.*

UNITED STATES PATENT OFFICE.

HOWELL W. SOUDER, OF TAMAQUA, PENNSYLVANIA.

TYPE-WRITING MACHINE.

SPECIFICATION forming part of Letters Patent No. 580,014, dated April 6, 1897.

Application filed January 28, 1893. Serial No. 459,984. (No model.)

*To all whom it may concern:*

Be it known that I, HOWELL W. SOUDER, a citizen of the United States, and a resident of Tamaqua, in the county of Schuylkill, in the State of Pennsylvania, have invented a new and useful Type-Writing Machine, of which the following is a description.

As is indicated by its title, the invention relates to the well-known class of printing-machines which are ordinarily designated as "type-writers;" and the object of the invention is to produce at a moderate cost a machine of this class which in its construction shall be simple and durable and which in its operation shall be capable of use in diverse ways in producing a variety of work with ease and celerity and with comparatively little noise from manipulation of the machine.

With this object in view the invention consists in various novel parts and in various novel combinations of parts in a type-writing machine wherein a longitudinally-placed type-wheel is made movable transversely of the machine, whereby a transversely-movable type-wheel is provided with antifriction-rollers, whereby a transversely-movable type-wheel is combined for operation with a transversely-extending supporting-shaft, whereby a transversely-movable type-wheel is made retractable, wherein a type-wheel-supporting shaft is made restrictedly rotatory upon its journals, whereby a type-wheel-supporting shaft is made variably rotative upon its journals, whereby a type-wheel-supporting shaft is caused to move a feeding device over a variable number of letter-spaces, whereby the alinement of the characters upon the type-wheel is regulated and controlled, whereby the alinement-lever when it has brought the character into alinement is permitted to continue its movement and cause the platen to incline against the type-wheel to receive impression, whereby the platen is made movable in an arc in a vertical plane to and from the periphery of the type-wheel, whereby an arm or carrier which engages the type-wheel is impelled transversely of the machine, whereby an arm or carrier is engaged by and has movement between and along transverse guide-supports or guideways, whereby an arm or carrier which is engaged in transverse guideways engages a transversely-movable type-wheel, whereby a guideway and a longitudinally-extending carrying-arm are made operative from the keyboard of the machine, whereby a transversely-extending guideway and a rotary platen are made simultaneously movable, whereby a platen is made rotatable either to feed forward the sheet which is receiving the imprint or backward to expose the last previously-written line or portion of a line, whereby uniformity in impression of the printed characters is produced, whereby a continuous roll spaced into sheets and mounted upon a reel or shaft is wound upon a secondary reel or shaft as the lines and sheets are printed, whereby a feeding device is made capable of such adjustment as to be moved continuously over one letter-space or continuously over two letter-spaces at the will of the operator, whereby a feeding device is continuously maintained in such adjustment as to permit it to be moved over five letter-spaces, whereby a feeding device is made capable of such adjustment as automatically to cause some of the keys which control the alinement of the characters to move such feeding device over three letter-spaces, some of such keys to move it over four letter-spaces, some to move it over five letter-spaces, and a few to move it over six letter-spaces, whereby the machine is made capable of producing character-impressions either by means of directly-inked type applied directly upon the paper or through the medium of an inked ribbon, whereby two inked ribbons, which may be either of different colors, or one "carbon" and the other "copying," may be carried upon the machine simultaneously and used interchangeably, whereby an inking-ribbon is automatically transferred back and forth from one reel to another, whereby character-impressions are produced noiselessly through contact of a platen and a vertically and longitudinally arranged type-wheel, whereby the machine is made operative to produce printed matter in two colors, whereby the machine is made operative to produce at a single impression words of either two, three, four, or five letters and to cause a feeding device to move over one space more than the number of letters contained in the word which is being printed, whereby the machine is made operative to print at one impression prefixes of a variable number of letters and to cause a feeding device to be moved over as many spaces as shall equal the number of letters in the prefix printed, whereby the machine is made operative to print at one impression affixes of a variable number of letters and to cause a feeding device to be moved over one letter-space more than the number of letters in the affix printed, whereby the spacing in statements and between sentences may be made by causing a feeding device with one depression to move over five letter-spaces, whereby the machine is adapted, through the operation of a shifting mechanism, to produce printed matter in cipher, whereby the machine is made operative, through change of position of an adjustable portion of the type-wheel, to produce printed matter in cipher, whereby the machine is made operative for the translation of matter which is printed in cipher, and in various other novel parts, groups, organizations, or combinations of parts, whereby the machine is in various respects and as a whole rendered more simple and durable in its construction, more multifarious in its functions, and more easy, effective, useful, and generally satisfactory in its operation, as will first be described, with particular reference to its various details of construction, and then specifically and distinctly set forth in the paragraphs which follow such detailed description.

Figure 6A:
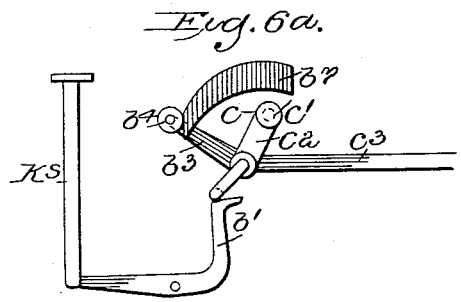
Figure 6B:
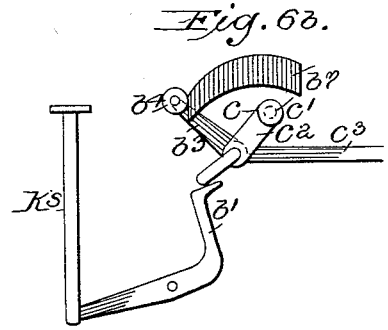
Figure 9B:
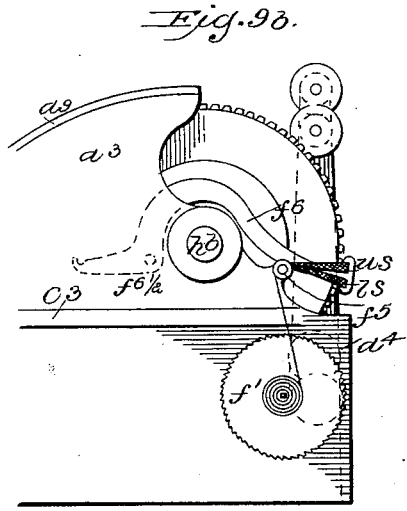
Figure 9C:
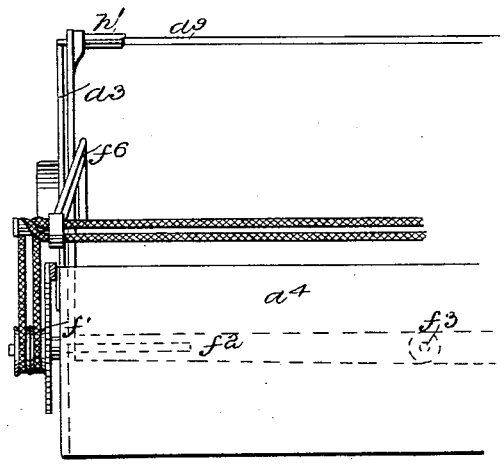
Figure 4E:
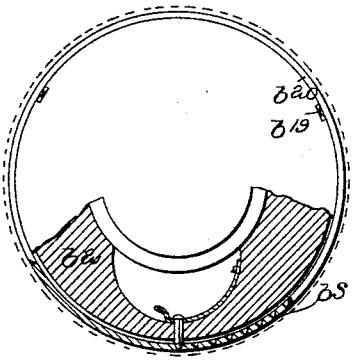
Figure 4F:
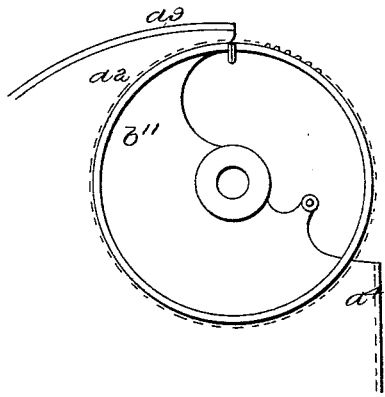
Figure 4G:
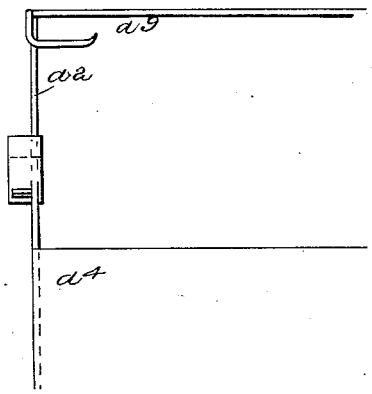
Figure 10B:
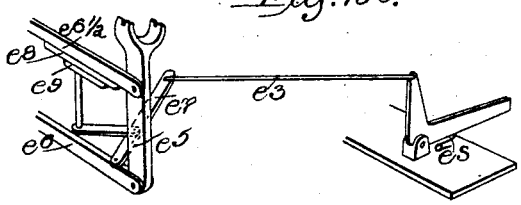
Figures 12, 13:
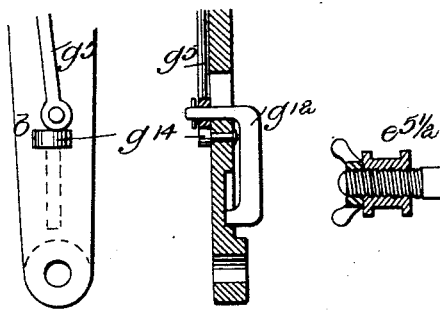
Figure 14:
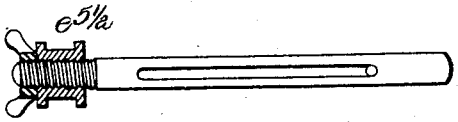
Figure 15:
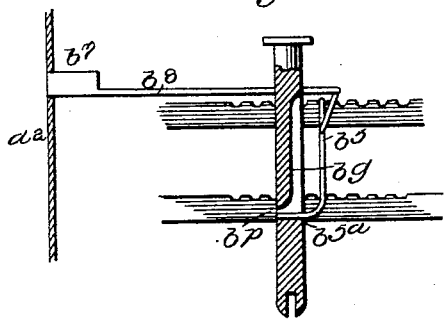
Figure 16:
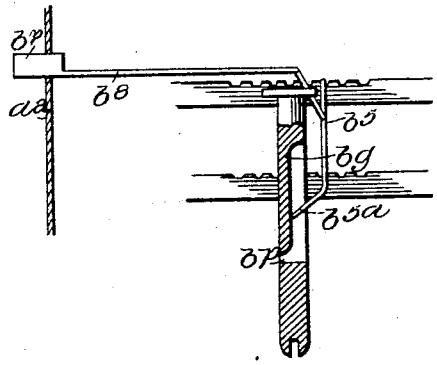

In the accompanying drawings, which constitute a part of this specification, Figure 1 represents a top plan view of the operative parts of the type-writing machine. Fig. 2 represents a side elevation, a roll of paper having been sleeved upon the paper reel or shaft. Fig. 3 represents a plan view of the keyboard, showing the arrangement of the keys. Fig. 4 represents a side elevation of the type-wheel, with its interior antifriction attachments, and as when provided with peripheral ink supplying and distributing appliances. Fig. 4$^a$ represents an edge view of the pinioned antifriction-roller and the coil-spring attached to its shaft and also a face view of the same. Fig. 4$^b$ represents an end or edge view of one of the inking appliances detached, the central portion of the same being represented in vertical section to show more clearly the ink chamber or receptacle and the threads upon the ink-expelling screw. Fig. 4$^c$ represents a side elevation of the type-rim and its carrier, portions of the carrier being broken out. Fig. 4$^d$ represents a transverse vertical central section of the type-wheel, in part in elevation, the wheel having been detached from its supporting-shaft. Fig. 4$^e$ represents an elevation of one of the key-stems, enlarged. Fig. 4$^{ee}$ is a partial side elevation of the type-wheel slightly modified. Figs. 4$^f$ and 4$^g$ are details representing the means for and manner of supporting the interchangeable type-rims when they are not in use. Fig. 5 represents a perspective view of the alining and impressing appliances detached. Fig. 6 represents a side elevation of the ratchet attachment and its immediate connections detached from its connection with the platen. Figs. 6$^a$ and 6$^b$ are details in side elevation representing in different adjustments the mechanism by which motion communicated to the key-stems is transmitted to the connecting-bars and their attachments. Fig. 7 represents a perspective view of the feeding and release appliances of the type-wheel detached. Fig. 7$^a$ represents a perspective view of the keys which operate the platen-feed, the key of the release appliance of the type-wheel, and the "5-space" key and its connections with the ratchet-bars. Fig. 7$^b$ represents a detail perspective view of the paper-roller, paper-guides, and scale detached from the platen. Fig. 7$^c$ is a detail top plan view of the ratchet-bars, showing the manner in which they are supported and operated. Fig. 7$^f$ is a front elevation of the ratchet-bars and their immediate connections, as represented in Fig. 7$^c$. Fig. 7$^g$ is a detail side elevation representing the ratchet-bars in their relation to the feed-arm, the connecting-bar, the shift-rod, and its spring-handle and stop. Fig. 7$^h$ is a detail front elevation, the right wall of the machine being represented in vertical section, showing the parts represented in Fig. 7$^g$, and in addition a plan of the engaging bar or wedge. Fig. 8 represents a portion of the release appliance of the type-wheel, consisting of the rearwardly-projecting arm with pawls and lift attached thereto and ratchet-bars in section. Fig. 9 represents a perspective view of the appliances whereby the inking-ribbon is supported and whereby it is changed in its adjustment. Fig. 9$^a$ represents an edge view and a plan view of the ratchet-wheel of the ribbon-feed. Fig. 9$^b$ is a detail side elevation showing the relation of the inking-ribbons to the type-wheel and its related parts. Fig. 9$^c$ is a detail rear elevation further illustrative of the manner in which the inking appliances are attached, supported, and operated. Fig. 10 represents a perspective view of the mechanism employed for changing the sets of printing-characters. Fig. 10$^a$ represents a detail longitudinal central section of the wheel-shaft and its attachment. Fig. 10$^b$ is a detail perspective elevation further illustrating the mechanism whereby the wheel-shaft is operated. Fig. 11 represents a perspective view of the cam and its attachments for operating the ratchet-bar of the feeding appliances in connection with the imprint of complete words. Fig. 12 is a detail front elevation, and Fig. 13 is a detail in side elevation, further representing the means whereby the extent of movement of the shift-rod in a vertical plane is regulated or controlled. Fig. 14 is a detail showing more fully the mechanism by which the machine is adapted to produce matter in cipher. Figs. 15 and 16 are detail elevations, partly in transverse vertical section, showing the relation of the key-stems and their rods to the key-plates and the interconnecting mechanism, Fig. 15 representing the parts as when the machine is at rest and Fig. 16 representing the key-stem as depressed and the key-plate as moved to the left. Fig. 17 represents faces of segments of type-rims.

As represented in the plan view, Fig. 1, of the machine A, the covering-plate $a^9$ (seen in Fig. 2) is removed to expose to view the front plate $a'$, the side plates $a^2$ $a^3$, with their rear extensions $a^8$, and the rear plate $a^4$, which together constitute the body or frame of the machine, upon which are supported, directly or indirectly, all the operative parts thereof.

In the following description the construction of the various parts and a clear indication of the operation and functions of each will be blended, and this will be succeeded by a distinct general description of the operation and of the various adjustments of the parts of the mechanism, whereby the numerous advantageous results of which they are capable are readily and certainly produced.

As will be seen in Figs. 1, 2, 4, $4^c$, $4^d$, 5, 7, and 11, a type-wheel is employed which consists of a central portion or carrier $b^{11}$ and an encircling type-rim $b^{20}$. The type-rim may be removed from the carrier and replaced by any one of several others which accompany the machine, such type-rims being exact duplicates, except as to the size, style, and arrangement of their characters. On the concave side of each type-rim are three equidistant square-bodied lugs $b^{19}$. (See Fig. $4^c$.) In the perimeter of the carrier $b^{11}$ are three equidistant square notches $b^{17}$, Fig. 4, of a size slightly larger than the lugs $b^{19}$, and on the convex surface of the carrier is a longitudinal groove $b^{18}$, Fig. $4^d$, having therein three equidistant stops, which are placed midway between the square notches $b^{17}$. The longitudinal groove $b^{18}$ is of such a size as to permit the lugs $b^{19}$ to be received snugly therein. By bringing the lugs $b^{19}$ of any of the type-rims to the notches $b^{17}$ of the carrier such type-rim may either be slipped entirely over the carrier or simply far enough on it to permit the lugs $b^{19}$ upon rotation of the type-rim to slip within the groove $b^{18}$ until brought against the stops in the groove. The type-rim will then be firmly held in place by the latch-spring and pin $b^{16}$, Figs. 4 and $4^c$.

All the type-rims which accompany a machine are adapted to encircle the triangular shaft $b^{10}$, those not in immediate use being for convenience suspended upon any suitable holders or hangers which project from the frame $a^2$ $a^3$, such holders or hangers being in any convenient number and each capable of receiving several type-rims.

The printing-characters are placed longitudinally upon the convex sides of the type-rims and are arranged thereon in three equal segments of a circle. The rims are of two kinds so far as their characters are concerned—those which contain capitals, small letters, figures, and punctuation-marks and those which contain capitals, complete words, affixes and suffixes, and figures and punctuation-marks. The type-rims which contain capitals and small letters have the characters arranged in the following manner: One segment contains the small letters, the letter most frequently used being placed on that portion of the segment which comes first in alinement, the remaining letters being arranged along such segment in such order of succession that the letter least frequently used is most distant from the letter which is most frequently used. Another segment contains capital letters, their order of succession exactly corresponding with that of the small letters. The remaining segment contains figures and punctuation-marks. (See Fig. $4^c$.)

The type-rims which contain no small letters have the characters arranged in the following manner: The alphabet, figures, and punctuation-marks are arranged exactly as on the rims just described, but the third segment contains frequently-used words, prefixes and suffixes of two, three, four, and five letters, which are arranged in the following manner: Words and suffixes of two letters and prefixes of three letters are grouped on that portion of the segment which comes first in alinement; words and suffixes of three letters and prefixes of four letters are placed next on the segment in the order named; words and suffixes of four letters and prefixes of five letters follow next, and, lastly, words and suffixes of five letters.

Through the hub $hu$ of the carrier-wheel $b^{11}$, the center of which is in coincidence with the center of the wheel, is a triangular opening $b^{15}$, Fig. 4, which is adapted to receive an equilateral triangular shaft $b^{10}$, which extends horizontally across the machine in a plane perpendicular to the key-levers. (See Figs. 1, 5, 7, $7^a$, and 10.) The carrier-wheel is intended to travel from side to side of the machine upon the triangular shaft $b^{10}$, and to secure ease of movement such carrier-wheel runs on six antifriction-rollers $b^{12}$ $b^{13}$, so arranged that on each edge of such shaft run two of such antifriction-rollers—one on each side of the carrier-wheel $b^{11}$. (See Fig. 1.)

Along one edge of the triangular shaft $b^{10}$ extends a rack $b^{14}$. The antifriction-roller $b^{13}$, mounted within the carrier-wheel $b^{11}$, is pinioned for engagement with the rack $b^{14}$. Mounted concentrically with such antifriction-roller, upon its tight shaft, is a small coil-spring $cs$, (see Fig. $4^a$,) which is nearly unwound when the carrier-wheel is at the extreme left of the shaft $b^{10}$, looking at it from the keyboard. The coil-spring winds more tightly as the carrier-wheel is moved toward or to the right of the shaft $b^{10}$, because of the movement of the pinioned antifriction-roller $b^{13}$ lengthwise along the rack $b^{14}$.

The longitudinally-extending arm $d^3$ engages the left exterior face of the carrier-wheel by its terminal antifriction beveled roller $d^4$. Upon the base of the arm $d^3$, which extends between the upper and lower bars $d'$ $d'$ of the guideway formed by said bars, are two pawls $d^5$ $d^5$. (See Figs. 1, 2, 7, and 8.) The pawls $d^5$ $d^5$, together with the guideway $d'$ $d'$, may be raised from their normal position by depressing the key "Line" in the keyboard (see Figs. 3 and 7) or by elevating with the hand the lift $d^6$. (See Figs. 2 and 8.) The pawls $d^5$ $d^5$ in their normal position engage with a feed in such manner that while engaged the arm $d^3$ may be freely moved to the right, but not to the left.

The feed consists of two horizontal ratchet-bars $d^7$ and $d^8$, which extend across the machine, one upon the other, their serrations extending rearward toward the triangular shaft $b^{10}$, the lower bar $d^8$ resting immovably upon opposite horizontal lugs, which project from the frame $a^2$ $a^3$, while the upper bar $d^7$ is free to move laterally along the bar $d^8$. (See Figs. 7, 7$^e$, 7$^f$, 7$^g$, 7$^h$, 8, and 11.)

A lateral movement, controllable by the operator, to equal either one, two, three, four, five, or six letter-spaces is imparted to the upper ratchet-bar $d^7$ in four distinct ways, as follows:

First. By depressing the "Spacer," Fig. 7, which rests upon the arms $d^{17}$ $d^{17}$, both of which are rigidly fixed upon the rod $d^{16}$, and thus throwing forward the upright or standard $d^{14}$, and with it the arm or rod $d^{13}$, the wedge $d^{15}$ upon the extremity of the arm or rod $d^{13}$ and in contact with the feed-arm $d^{11}$, thereupon causing such feed-arm to incline to the left sufficiently to impart to the bar $d^7$ a movement equal in extent to one or two letter-spaces. (See Figs. 7, 7$^e$, 7$^f$, 7$^g$, and 7$^h$.)

Second. By means of the keys in the keyboard, excepting the keys "Cap.," "Fig.," "Line," "Platen-feed," and "5 space," such keys resting on the L-levers $b'$, (see Figs. 1 and 2,) and all having heads on their vertical arms in contact with the alinement-lever $b^2$. The depression of any key except those above specified operates to elevate the alinement-lever $b^2$, which, before its arc of movement is completed, brings forward the rods $c^3$ $c^3$ in manner more fully explained hereinafter. Upon the inner face of the rod $c^3$ at the right of the machine (see Fig. 7) is a horizontally-extending wedge-like projection $d^{10}$, which is in contact with the feed-arm $d^{11}$ in the manner shown, so that such rod $c^3$ causes the feed-arm $d^{11}$ to incline sufficiently to the left to impart motion to the ratchet-bar $d^7$ for a distance equal to one or two letter-spaces. The lever $d^{12}$ is fixed on the shift-rod $d^{18}$, to which is attached the handle $d^{19}$. When the handle $d^{19}$ is turned over to the left, the feed-arm $d^{11}$ and its fulcrum are lowered, and the ratchet-bar $d^7$ is caused to move over one letter-space. When the handle $d^{19}$ is turned to stand vertically, the feed-arm $d^{11}$ and its fulcrum are elevated, and in operating the machine the ratchet-bar $d^7$ is caused to move over two letter-spaces. Formed with or provided upon the handle $d^{19}$ is a spring $d^{20}$, which is intended to maintain the handle in a vertical position. (See Figs. 7$^g$ and 7$^h$.)

Third. By depressing the key "5 space" (see Figs. 2 and 7$^a$) the lever $k'$, by means of the rod $k^2$, operates to elevate the horizontal arm $k^3$ of the bell-crank lever $kc$, which is mounted upon pivot $k^4$, and thus the vertical arm $k^5$ of the lever is caused to incline sufficiently to the left to move the ratchet-bar $d^7$, with which it is in contact, a distance equal to five letter-spaces.

The fourth way in which motion is imparted to the ratchet-bar $d^7$ is through the rotation of the triangular bearing-shaft or carrier $b^{10}$. Upon the left extremity of this shaft $b^{10}$, which projects through the left side wall of the machine $a^3$, is fixed a cam $m$, as shown in Fig. 11. The lever $m^3$ is removable by lifting it from the pin $m^4$, upon which it is fulcrumed, but when in position it operates in the following manner: Upon depressing the key "Cap." any subsequent motion imparted to the shaft $b^{10}$ by means of the keyboard will cause the cam $m$, which rotates with such shaft, to operate the lever $m^3$ by throwing outward that extremity of the arm or lever $m^3$ which is in contact with the cam $m$, and thus forcing in an opposite direction the opposite extremity of such arm or lever, and with it the pin $m^5$ and the ratchet-bar $d^7$.

As a full third of a revolution of the shaft $b^{10}$ is effected by such rotation the ratchet-bar will be caused to move consecutively over three, four, five, and six letter-spaces. In other words, when the lever $m^3$ rests upon the pin $m^4$ and the shift-key "Cap." is depressed a portion of the keys which operate upon the alinement-lever $b^2$ will give the shaft $b^{10}$ sufficient rotation to move it over four spaces. Still another portion of the keys will cause such rotation of the shaft as to move the ratchet-bar over five spaces, and a few will operate to move it over six spaces.

The feed is intended to impel the carrier-wheel, space by space, along the triangular shaft $b^{10}$ from the frame $a^2$ at the left toward or quite to the frame $a^3$ at the right of the shaft. In feeding forward the carrier-wheel $b^{11}$, in moving over the rack $b^{14}$, the pinioned antifriction-roller $b^{13}$ will have given the coil-spring $b^{13½}$, attached to its shaft, sufficient tension to return the carrier-wheel to the left of the shaft $b^{10}$ from any point on said shaft to which such wheel may have been fed. Elevation of the guide $d'$ $d'$, by depressing the key "Line," will operate to disengage the pawls $d^5$ $d^5$ from the feed $d^7$ $d^8$, whereupon the coil-spring $b^{13½}$ will return the carrier-wheel to the left of the shaft $b^{10}$ whatever the position of the carrier-wheel may be when the disengagement is made.

The shaft $b^{10}$ is permitted by its bearings to be turned on its axis by depressing any one of the keys of the keyboard excepting only the keys "Line," "Platen-feed," and "5 space."

Each of the two shift-keys "Cap." and

"Fig." (see Figs. 1, 2, 3, and 10) gives the shaft $b^{10}$ a third of a revolution, the key "Cap." causing rotation opposite to and the key "Fig." similar to the movement of the hands of a clock. The object of the shift-key is to present any one of the faces of the shaft $b^{10}$, with the corresponding characters upon the wheel $b^{11}$, toward the platen $g$ at the pleasure of the operator, and while so held and presented still permit said shaft to receive from the keyboard so much as a third of a revolution or definite fractions thereof.

The operation of the shift-keys is as follows: Depression of the key "Fig." upon the lever $e^2$ operates to bring forward the rod $e^3$, and with it the plate $e^8$, to which the rod $e^3$ is attached. The plate $e^8$ is connected at its rear extremity with the pin $e^6$ and near its midlength with the shorter plate or link-bar $e^9$. As the shorter plate or link-bar $e^9$ is connected by its pin to the frame of the machine, the forward movement or opening of the plates, as shown in Fig. 10, forces the pin $e^6$ into its guideway in the frame of the machine, (see Fig. $10^a$,) and thereby carries with it the lower arm of the lever $e^5$, fulcrumed at the mid-height $e^7$ of the lever $e^5$, (see Fig. 10,) pulls the pin or stem $e^4$ out of the oblique groove $e^{10}$, and causes rotation of the shaft $b^{10}$. (See Figs. 10, $10^a$, and $10^b$.)

The operation of the key "Cap." is exactly like that of the key "Fig" with the exception that the pin $e^{6\frac{1}{2}}$ of the capital-shift when forced into its guideway causes movement simultaneously with itself of the lever $e^5$, now fulcrumed at the point $e^{7\frac{1}{2}}$, which pushes the pin or stem $e^4$ into the oblique groove $e^{10}$, and thus causes rotation of the shaft $b^{10}$ in an opposite direction. With the pin $e^4$ in its inner adjustment, in its outer adjustment, or midway between these extremes any one of the faces of the triangular shaft $b^{10}$ is capable of being thrown toward the platen $g$. (See Figs. 10 and $10^a$.)

The lever $b^9$ (see Figs. 1, 5, and 10) is attached to the pin $e^4$ in such a manner as to permit the pin to slide longitudinally, but not to revolve within such lever, such revolution being in this instance prevented by a spline. This arm $ba$ of the lever $b^9$ is connected by the rod $b^8$ and the lever $b^3$ with the alinement-lever $b^2$. Such alinement-lever $b^2$ is formed at its ends with cranks $bc$ and $bc'$ at its left and right extremities, as shown in Figs. 1 and 5, and is fulcrumed upon the arms $c^2 c^2$, which are fixed on the transverse rod $c$, which has end bearings $c' c'$. Elevation of the alinement-lever through the full extent of the arc within which it has movement causes a third of a revolution of the shaft $b^{10}$, and with it of the type-wheel upon the shaft. It follows from this that to give the shaft $b^{10}$ anything less than a third of a revolution the alinement-lever $b^2$ must be raised through only a portion of its arc of movement. Each of the keys of the keyboard, excepting the keys "Cap.," "Fig.," "Line," "Platen-feed," and "5 space," slightly raises the alinement-lever, the lift given to such lever by a particular key being just sufficient to bring into alinement opposite the platen $g$ the character it controls on that segmental portion of the type-wheel which is presented to such platen.

The key-levers are all of the first class in the shape of an L and differ only in the length of the longer arm of the L and in having their fulcrums at different distances from the shorter arm of the L. The shorter arms of the L are all of the same length and stand vertically in the same line, each having a head $h$, which comes in contact with the alinement-lever $b^2$. (See Figs. 2 and 5.) On the longer arm of the L is the key, the vertical stem of which passes through a drilled hole in the top plate $t$ of the machine and in its lower portion is slotted or bifurcated to bestride the L-lever.

Behind the triangular wheel-shaft $b^{10}$ and parallel with it is a rubber-covered platen $g$, the reduced ends $ge$ and $ge'$ of which are journaled in bearings which are formed in the vertical rockers $c^4 c^5$, which are mounted on the side walls of the frame of the machine by short bearings $c^6 c^6$. The attachments of said platen consist of the feed-roller $fr$, which is held in contact with the platen by the springs $s$, (shown in Fig. 2,) and the paper-guides $c^8 c^9$, Fig. $7^b$, the guide $c^9$ having a scale $c^{10}$ on that side which is exposed to view.

Either of the two coincident pawls $g^6 g^6$, Fig. 6, may be engaged with the square-toothed ratchet $g^2$ on the extremity of the platen $g$, and through their provision such platen may be revolved in either direction, according to the requirement of the work which is being performed. The engagement of one pawl and the disengagement of the other are effected by throwing the handle $g^{5a}$ of the shift-rod $g^5$ backward or forward in the curved slotted yoke $y$, which supports the pawls. The pawl on the side toward which the rod is pushed will be disengaged by the pin on the shift-rod $g^5$, which moves in the curved slotted yoke slipping over the small lever $g^7$, which is connected with the pawl. (See Fig. 6.) The platen is caused to rotate by an upward motion of the shift-rod $g^5$, which is imparted to it by depressing either of the two keys "Line" and "Platen-feed." Depression of the key "Platen-feed" pushes back the rod $i^2$. The wedge-shaped point on the rear extremity of such rod is thereby caused to move rearwardly over the roller $i'$ upon the rocker $c^4$, whereby a lift is given to the elbow or angle-piece $g^{12}$, the vertical portion of which extends upwardly to a point opposite the bearings $gb$, and the horizontal upper extremity $g^{15}$ of which is pivotally connected to the lower extremity of the shift-rod $g^5$, whereby the upward movement is imparted to the curved slotted yoke or lever fulcrumed at its midlength on the journal of the platen. The key "Line" operates the platen in a similar manner. (See Figs. 6, 9, $9^a$, 12, and 13.)

The lift given the rod $g^5$ may be adjusted by the stop $g^{14}$ in such manner as to cause the operating-pawl $g^6$ to take either one or two of the teeth of the ratchet-wheel $g^2$. The stop $g^{14}$ may be so turned on the pin which holds it to the rocker $c^4$ that the rod $g^5$ may rest either upon the side or upon the edge of the stop. When the rod $g^5$ rests upon the side of the stop $g^{14}$, as shown in Fig. 6, the elbow $g^{12}$ is permitted to come into contact with the wedges $g^{13}$ when they are in their seated position, and the depression of the key "Platen-feed" or of the key "Line" will cause the wedges $g^{13}$ to lift the rod $g^5$ sufficiently to cause the operating-pawl $g^6$ to take at one movement two teeth of the ratchet-wheel $g^2$. When the stop is so turned that the rod $g^5$ rests on the edge of the stop, the extension $g^{12}$ will be held so far from the wedges $g^{13}$ that the greatest lift they can give will cause the operating-pawl $g^6$ to take only one tooth of the ratchet-wheel $g^2$. The platen, aside from the rotation on its axes, is subject to a vibration by which it is brought into contact with the type-wheel. This motion is produced whenever a key controlling the alinement of the characters on the type-wheel is depressed, the rockers $c^4$ $c^5$ being drawn forward by the rods $c^3$ $c^3$, which are fulcrumed to receive motion when the arms $c^2 c^2$ are lifted by the alinement-lever $b^2$ in the manner best indicated in Figs. 6$^a$ and 6$^b$. When a key brings a letter into alinement, it is there held until the platen is drawn to the type-wheel with the pressure necessary to produce impression. The platen in being brought to the type-wheel moves through a space of less than one-fourth of an inch.

In order that the impressions produced by the characters may be uniform and that perfection of imprint and beauty of the written line may be thereby maintained, the rockers $c^4$ $c^5$, by the stops $d^{10}$, Fig. 7, allow the platen to come against the type-wheel with no greater pressure than is necessary to make a perfect impression, the comma, period, and other minute characters, which might otherwise easily penetrate the paper, being allowed to project just so far from the type-wheel as to permit only the proper degree of pressure required for a uniform impression.

The mechanism to secure alinement and maintain it while the platen is brought to the type-wheel to make an impression is shown in Figs. 1, 5, 6$^a$, and 6$^b$, and consists of the roller $b^4$ upon the outer extremity of the short arm $b^3$ at the left of the machine, the series of key-plates $b^7$, and the series of plate-rods $b^6$ and key-rods $b^5$. The rods $b^6$, as shown in Figs. 1 and 5, connect the key-plates $b^7$ with the rods $b^5$, which in turn are connected with the key-stems. In the side of each key-stem is cut a square groove $bg$, at the lower extremity of which a transverse perforation $bp$ is provided in the body of the key-stem, both groove and perforation being adapted to receive the laterally-bent lower extremity of the key-rod $b^5$. (See Fig. 4$^e$, showing one of the key-stems K$^6$ detached, and Figs. 15 and 16, representing such stem and its connections.) When any one of the key-stems is in its normal position, that is, before it is depressed, the bent end $b^{5a}$ of the rod $b^5$, in connection with such stem, extends into the perforation at the bottom of the groove. Depression of the key carries downward the bent end of the rod $b^5$ sufficiently to cause the rod to throw into the path of the roller $b^4$ that one of the plates $b^7$ which is connected with the key which is depressed, and then slips out of the perforation into the groove in which it slides until full depression of the key has been made.

The plates $b^7$ and the character-keys are equal in number, each key, through the rods $b^5$ and $b^6$, being connected to one plate, which it throws into the path of the roller $b^4$. When a given key is depressed, the roller $b^4$ is brought into contact with the plate controlled by such key at the exact time when the corresponding character is brought into alinement. When the alinement has been made, it is maintained by the roller holding the type-wheel stationary, as further depression of the key is continued to bring the platen against the type-wheel, such further depression having the effect of moving the roller $b^4$ upward against the plate with which it is in contact, and thus causing it to raise the arms $c^2$ $c^2$, and thereby draw farther forward the lateral connecting-rods $c^3$ $c^3$ to tilt forward the rockers $c^4$ $c^5$, upon which the platen rests.

The ribbon-reels $r$ and $r^2$ (see Figs. 2, 9, 9$^a$, 9$^b$, and 9$^c$) are slipped upon square spindles which extend outside of the ratchet-wheels $f'$ $f'$, with which they revolve. The ratchet-wheels have their bearings (see Fig. 9$^a$) in the ends of the long lever $f^2$, which extends across the machine and outwardly through the side walls $a^2$ $a^3$, and is fulcrumed at its mid-length upon the pin $f^3$, which projects horizontally forward from the rear wall $a^4$ of the frame of the machine.

The ribbon from the reel at the left of the machine is extended upward over the guide-roller $f^5$, rearward toward the platen $g$, laterally through one of the guide-slots $fs$ at the end of the arm $f^6$, thence across the machine through the slot of the arm $f^6$ at the right of the machine, and to the reel on that side in similar manner as from the reel on the left.

The motion given to the ribbon-feed is imparted by the return of the rods $c^3$ $c^3$ after bringing the platen forward against the type-wheel. The adjustment of the lever $f^2$ is such that when one of the two ratchet-wheels $f'$ $f'$ is engaged with its pawl $f^{11}$ the other will be disengaged, and as a result the reel on the side which has its ratchet engaged winds upon itself the ribbon from the other reel. When the ribbon has all been reeled to one side, being securely fastened to the reels, it takes tension and pulls upward that end of the lever $f^2$ upon which is the now unribboned reel, engages the ratchet and pawl on that side, and thereby automatically reverses the ribbon-feed.

By the action of the springs $f^{12\frac{1}{2}}$ $f^{12\frac{1}{2}}$ the longer arms of the upwardly-curved levers $f^6$ $f^6$ elevate the ribbon and cause it to intervene between the platen $g$ and the type-wheel, the vertical rods $f^{12}$ $f^{12}$ being caused to drop by reason of their connection with the forwardly-extending horizontal arms $f^{15}$ $f^{15}$ of the vertical rockers $c^4$ $c^5$ whenever the depression of a key causes the rods $c^3$ $c^3$ to bring forward the platen to make an impression.

The described mechanism permits the elevation of the ribbon or ribbons to two distinct heights. If the stops $f^{13}$ $f^{13}$ are in a vertical position, the shorter arms of the levers $f^6$ $f^6$ will come to rest upon them by the drop of the rods $f^{12}$ $f^{12}$, and in such case the ribbon, if in the upper slot on the longer arms of the levers $f^6$ $f^6$, will be caused to intervene between the platen and the type-wheel. As the stops $f^{13}$ $f^{13}$ are fulcrumed in bearings $f^{14}$ $f^{14}$ upon the inner face of the side walls $a^2$ and $a^3$, they may be thrown from their vertical position by bringing into the same horizontal plane the rods $f^{10}$ $f^{10}$, with which by their lower extremity they are connected. This is accomplished by turning over to the left or depressing the key "Color" of the lever $f^8$ $f^8$, when the shorter arms of the levers $f^6$ $f^6$ will, by the drop of the rods $f^{12}$ $f^{12}$, come to rest upon the lugs through which the rods $f^{12}$ $f^{12}$ slip, and in such case the ribbon, if in the lower slots, will be elevated and caused to intervene between the platen and the type-wheel. It follows from this that two ribbons may be simultaneously mounted upon the machine and used interchangeably. The ribbons employed are only one-fourth of an inch in width, and the adjustment made is such as to cause their elevation in the first half of the movement of the platen to the type-wheel.

Figs. 4, $4^b$, $9^b$, and $9^c$ represent the device for using printers' ink. In these figures $h'$ is a square transversely-extending rod which rests in bearings $hb$ in the side walls $a^2$ $a^3$ of the frame of the machine. Upon the rod $h'$ is received a circular receptacle $cr$, which contains printers' ink, particles of which are forced through minute perforations $p$ in the rim by pressure produced by means of the packed thumb-screw $h^5$, which is screwed into the ink-chamber on the screw-thread $h^4$, which is provided upon the solid center $h^3$ of the receptacle. The ink is of such consistency as to require pressure to force it to flow from the receptacle.

Mounted in bearings above the ink-receptacle is a distributing-roller $h^6$, which receives ink from the rim of the receptacle and transfers it to the face of the type. The distributing-roller alone comes in contact with the type, and in order that it may maintain its coincidence with the type-wheel it has end flanges which extend over and embrace the body of the wheel. Two of these inkers are used, one above and the other below the line of alinement, and each supported in the manner described. When either the ribbon device or the device for using printers' ink is to be employed, the other will be detached.

As the platen simply vibrates, the paper to be written on may be fed into the machine from a roll. In Fig. 2 $g'$ designates a roll of paper upon a shaft which revolves on bearings in the extension $a^8$ of the side walls $a^2$ $a^3$. The paper is transversely perforated at equal distances and separable at the perforations into sheets. If it is desired to keep the written sheets together, they may be received and held on the paper-covered roller $pc$ at the extremity of the swinging arms $sa$, the roller revolving by reason of the contact which it maintains with the roll of paper $g'$.

As will be seen in Figs. 10, $10^a$, and 14, the clutch $e^{5\frac{1}{4}}$ on the pin $e^4$, forming, with the keys "Cap." and "Fig.," part of the shifting mechanism, which operates to bring into alinement the capitals, figures, and punctuation-marks, is capable of being screwed in and out on the pin $e^4$ and when adjusted is secured in position by means of a thumb-screw. Ordinarily the position of the clutch $e^{5\frac{1}{4}}$ on the pin $e^4$ is such that when the keys "Cap." and "Fig." are in their normal position the first letter on that third or segment of the type-wheel which contains the small letters will be in alinement. Such clutch, however, is capable of being so adjusted on the pin $e^4$ that when the keys "Cap." and "Fig." are in their normal position any letter on the type-wheel may be put in alinement. When such adjustment has been made, a given key will no longer bring into alinement the character which it indicates, but some other. Again, when the lugs $b^{19}$ of the detachable type-rim $b^{20}$ are against the stop in the groove $b^{18}$ and are held there by the spring $b^{16}$ the characters on the type-rim which reach alinement and make impression will correspond with the characters shown upon the keys which are depressed; but if the type-rim be given partial rotation upon its carrier $b^{11}$ and be maintained in position by the engagement of the spring-pin $b^{16}$ with one of the series of serrations $bs$, as represented in Fig. $4^{ee}$, so that the lugs $b^{19}$ do not rest against the stop, the characters thrown into alinement will not correspond with the keys which are depressed to make impression. It follows that by either of these expedients alone or by both together the production of matter in cipher may be accomplished.

In the preceding description the operation of the several parts or groups of parts has already been perhaps sufficiently indicated.

A description of the combined operation of the parts in writing, which only repeats much that has already been stated, is as follows: Having adjusted that pawl, Fig. 6, which causes rotation in a direction contrary to that of the hands of a clock—that is, upward and backward from right to left—the paper, which may either be in separate sheets or taken from a roll of paper $g'$ upon the paper-shaft, is inserted in the paper-guide of the platen $g$ at $c^8$, which will pass it between the feed-roller and the platen by successive strokes upon the key "Line" in the keyboard. After the paper has in this manner been fed forward to the desired distance the type-wheel, if not at the moment at the left extremity of the shaft $b^{10}$, should be brought to that point before beginning to write. Should the wheel be near the middle or at a point toward the right of the machine, the arm $d^3$ should be lifted, and with it the guide $d'$ $d'$ also, which may be accomplished by means of the lift $d^6$. The pawls $d^5$ $d^5$ being thus released from the ratchet-bars $d^7$ $d^8$, the type-wheel may be freely moved along the shaft in either direction and may readily be adjusted at the left of the machine.

If it is desired that the writing shall be executed with capital and small letters, a type-rim containing capital and small letters will be applied upon the carrier-wheel in the manner already described.

Should it be required first to begin with a capital letter, the key marked "Cap." will be depressed with the left hand, whereupon pin $e^{6\frac{1}{2}}$ (see Fig. 10$^a$) will push such pin into the oblique groove in the bearing of the shaft and turn the same in such manner that the type-wheel upon it will bring into alinement the first letter of that section of such wheel which contains the capital letters. Again, holding down the key "Cap.," the other hand may depress the key which controls the letter to be written.

The first effect of the depression of the second key will be the simultaneous elevation of the alinement-lever $b^2$ and the movement into the path of the roller $b^4$ of that one of the plates $b^7$ which is connected with the key which is being depressed. As the elevation of the alinement-lever is continued the roller $b^4$ will come into contact with the plate, which is thrown in its path at the same instant of time in which the letter to be written reaches alinement, and this alinement will be maintained as the arms $c^2$ $c^2$ are lifted by the still further elevation of the alinement-lever, in conjunction with the upward movement of the roller $b^4$ against the plate with which it is in contact. The lift given the arms $c^2$ $c^2$ by the alinement-lever $b^3$ brings forward the connecting-rods $c^3$ $c^3$, whereby two functions are performed. The wedge $d^{10}$ upon the rod $c^3$ at the right of the machine is caused to operate upon the ratchet-bar $d^7$, giving it a lateral motion, the extent of length of traverse being just sufficient to carry one of the teeth of the bar $b^7$ beyond the pawl $d^5$, engaged with it. The vertical rockers $c^4$ $c^5$, on which the platen is mounted, are given a forward tilt with a double effect. During the first half of the forward movement of the rockers their horizontally-extending portions $f^{15}$ $f^{15}$, together with the vertical rods $f^{12}$ $f^{12}$, which are pivoted in their front extremities, are made to drop, with the result that the springs $f^{12\frac{1}{2}}$ $f^{12\frac{1}{2}}$ are permitted to act upon the bent ribbon-bearing levers $f^6$ $f^6$, the longer arms of which are thereby elevated, and the ribbon which they support is caused to intervene between the platen and the type-wheel. Again, the platen when the rods $c^3$ $c^3$ have nearly finished their traverse is brought against the type-wheel with the pressure required to cause the character held in alinement to make an impression. Upon releasing the key "Cap." the spring $es$, Fig. 10$^b$, provided for the key, brings it back to its normal position and in doing so reverses the movement of the pin $e^4$, with the result that the shaft $b^{10}$ turns back and presents to the platen $g$ that third of the type-wheel which is provided with the small letters.

The letter having been imprinted, upon the release of its key the spring against which the alinement-lever $b^2$ was raised will operate to restore such lever to its normal position, with the result that the rods $c^3$ $c^3$ will operate to move the platen rearward from the type-wheel. The elevation of the horizontal extensions $f^{15}$ $f^{15}$ will thereupon ensue, and the ribbon or ribbons will in consequence drop from between the platen and type-wheel. That one of the pawls $f^{11}$ which is then in engagement with its ratchet-wheel will move said wheel forward one tooth and will cause the reel upon the operating ratchet-wheel to take ribbon from the other reel. The wedge $b^{10}$ on the rod $c^3$ at the right of the machine will move away from the ratchet-bar $d^7$, which bar will return to its normal position and carry the type-wheel with it over one letter-space. The pinioned antifriction-roller $b^{13}$, mounted within the type-wheel, will be caused by moving over the rack $b^{14}$, with which it is engaged, to slightly increase the tension of the coil-spring attached to its shaft. The roller $b^4$ will move away from the plate with which it was in contact. Such plate will return to its normal position, and simultaneously with its return the shaft $b^{10}$, and with it the type-wheel, will turn back, so that the first letter of that third of the wheel which is in coincidence with the platen will be in alinement. The depression of the key which controls the next character to be written causes a like operation, and when it is finished the type-wheel will be another space to the right in position to plant its next letter alongside that last written, the coil-spring within the type-wheel will have taken a little more tension, and the operating-pawl of the ribbon-feed will have pushed its ratchet one tooth farther. As long as the keys controlling the characters continue to be depressed one after another the operation described will continue. When a word has been written, depression of the spacer (see Figs. 1 and 7) will move the ratchet-bar $d^7$ the distance of one tooth to the left, and upon the release of the spacer the return of the ratchet-bar will carry the type-wheel one letter-space to the right without bringing a letter into alinement or producing an impression. When a line has been written, depression of the key "Line" will elevate the guideway $d'$ $d'$ and release the pawls $d^5$ $d^5$ from the ratchet-bars $d^7$ $d^8$ by the operation of its coil-spring, the type-wheel will be returned to the left of the machine, and the platen $g$, through the connection of its ratchet and pawl with the key "Line," will be turned forward for the next line of writing. Thus line after line may be written, the type-wheel being returned to the left of the shaft $b^{10}$ and the platen $g$ slightly rotated for a new line of writing, wholly through the operation of the keyboard.

If greater speed in writing than can be attained by writing all words letter by letter is desired, the operator will place in position the lever $m^3$ and adjust upon the carrier-wheel a type-rim which has one of its segments provided with complete words, prefixes, and suffixes, which being done the words of most frequent occurrence in composition and the prefixes and suffixes of other words of frequent occurrence may be written by making one depression in the same manner as for a single letter. By this means the speed with which written sheets are produced will be greatly accelerated, the increase in any given period being generally more than twenty-five per centum. In taking advantage of this expedient to increase the speed of writing the manipulation of the keyboard is in no way different from that employed when the writing is produced letter by letter, and the operation of the mechanism is identical, except that the feed device accommodates itself in such manner as to carry the type-wheel over one space more than the total number of letters in the word or suffix written and over only so many spaces as equal the number of letters in the prefix written.

Upon depression of the shift-key "Cap." each one of the character-keys will control the alinement of a word, or prefix, or a suffix. All words and suffixes of two letters and prefixes of three letters are brought into alinement by keys which give to the shaft $b^{10}$ no more rotation than is just sufficient to cause the cam $m$ on its extremity to move the ratchet-bar $b^7$, by means of the lever $m^3$, so far to the left that in returning to its seated position it will carry the type-wheel over three letter-spaces. Similarly all words and suffixes of three letters and prefixes of four letters will come into alinement when the cam $m$ has been given sufficient rotation to cause the type-wheel to be carried over five letter-spaces, and so on, the alining of words, prefixes, and suffixes and the adjustment of the cam $m$ being so timed that the type-wheel is always carried over one letter-space more than the number of letters in the word or suffix written and over no more spaces than equal the number of letters in the prefix written. It follows from this that the space between the word or suffix written and the next succeeding word is effected by the same key-depression which produces the impression, and it also follows that with the impression of a prefix no space is effected, as none is desired.

When a sentence has been finished and the next sentence is not thrown into a new paragraph, the space between the two sentences may be made by one depression of the key "5 space." The "5 space" key may be used with advantage for the spacing preceding a paragraph, also in bills, statements, &c., and with all the type-rims.

If it is desired to produce writing in which the letters thrown are placed farther apart than in ordinary writing, the operator will turn over to the left the handle $d^{19}$, when the feed-arm $d^{17}$, with its fulcrum, will be thereby lowered, and the operation of the ratchet-bar $d^7$ will carry the type-wheel continuously over two letter-spaces upon the depression of any character-key or of the spacer. This device may be used only with type-rims which are provided with capital and small letters.

If it be desired to produce writing in two colors, the operator will place upon the ribbon-feed a ribbon of each of the required colors, one threaded through the lower slot $ls$ and the other through the upper slot $us$ at the extremities of the longer arms of the lever $f^6 f^6$, when the ribbons may be caused alternately to intervene between the platen and the type-wheel, as letter by letter or word by word or sentence by sentence is written, the alternation being effected by depression and release of the key "Color," whereby the stops $f^{13} f^{13}$ are thrown into and out of the path of the shorter arms of the levers $f^6 f^6$.

When the ribbon has all been wound upon one reel, the tension it takes will pull upward that end of the lever $f^2$ upon which the empty reel is, and the shift effected will disengage the pawl just in operation and engage the other pawl with its ratchet-wheel, and thus automatically reverse the feed.

Should it be necessary when writing to make a correction, the operator will shift the rod $g^5$ in the slotted yoke and thus disengage the pawl just in operation and at the same time engage the other pawl with the ratchet $g^2$, whereupon successively depressing the key "Platen-feed" will feed the paper back over what has been written.

If it be desired to make transcripts in indelible ink, the inker, Fig. $4^b$, will be attached by placing the rod $hi$, upon which it is received, in its bearings in the side walls $a^2 a^3$ of the frame, and the ribbon-inking device will be detached by throwing around its pawls, so as not to operate, and unhooking the springs $f^{12½} f^{12½}$ from the shorter arms of the levers $f^6 f^6$.

When it is desired to keep the transcript together, that is, in a continuous sheet, the paper may be fed from the roll $gl$ and as written upon wound on the paper-covered secondary roller by contact with the lower roll. After the transcript has been made the sheets may be separated at the perforations, the paper in rolls being perforated at equal distances apart. When it is desired to turn work out rapidly, it will be advantageous to take the paper from rolls, as the written sheet will always pull in place the sheet next to be written upon, and thus effect much saving of time.

When the clutch $e^{5\frac{1}{2}}$ upon the pin or stem $e^4$ is so adjusted that the machine no longer brings into alinement the character shown on the key which is struck, but substitutes another, that is, as when the lugs $b^{19}$ of the type-rim $b^{20}$ do not rest against the stop in the groove $b^{18}$, but are held upon the carrier by the engagement of the spring-pin $b^{16}$ with one of the serrations $bs$ in the concave side of the type-rim $b^{20}$, as in Fig. $4^{cc}$, the writing will be produced in cipher. By these means the matter written may be transposed in a great number of ways.

To translate the cipher-written matter, the clutch must be set back and so adjusted, or the type-rim must be moved into such position upon the carrier that in copying such matter the characters which make impression will correspond with the characters shown upon the keys when operated to produce the cipher-written matter.

It will be apparent that by suitable modifications of the described construction the shaft which receives the type-bearing wheel might be provided with four faces instead of but three, and that corresponding changes in the divisions of the wheel and in its connections would follow, all without involving any departure from the invention as herein described.

It will be understood that the purpose and arrangement of the independent key or shift-key of this machine are to be distinguished from those of the shift-key of that class of machines in which the number of printing-characters exceeds the number of finger-keys and in which the shift-key merely determines which of two or more characters on a given type-bar shall be printed by the depression of a given key. In all such machines both or all of the characters of a given type-bar are indicated upon the finger-key which controls or actuates such bar, and the character printed is necessarily one of those which are indicated upon the finger-key; but under the construction and operation above described the shift-key may be caused to bring any character of the entire series into printing connection or relation with any given key of the series, and the character which is printed and that which is indicated by the key which is depressed will not be in correspondence, and thus the written matter will be cryptographic and wholly incomprehensible until translated.

It should be understood that this application is a substitute for and a continuation of and embraces the matters which are contained in an application for a patent for a type-writing machine, Serial No. 433,300, which was filed by me in the United States Patent Office on the 17th day of May, 1892, and which it is my intention to formally abandon.

The nature and the objects of the invention having been thus set forth and the construction and the operation of the apparatus in which it is embodied having been thus fully described, what is claimed is—

1. In a type-writing machine, a type-bearing wheel which is arranged longitudinally of the machine, and is provided with a coil-spring which in the operation of the machine is movable, at the will of the operator, by successive equal or unequal steps, from one side to the opposite side of the machine, and which, upon the completion of such step-by-step movement, is retracted, by the coil-spring at a single movement, to the position which it first occupied.

2. In a type-writing machine, a transversely-extending shaft which is provided lengthwise with a rack; combined with a type-bearing wheel which is received upon such shaft, and which in the operation of printing engages a pinion with the rack on the shaft, and is successively moved along the shaft, through controllably varying distances, until a line of writing has been completed, and which upon the completion of a printed line is, at a single movement, withdrawn to its original position.

3. In a type-writing machine, a transversely-extending serrated shaft which is supported at the sides of the machine, and a vertically and longitudinally arranged type-bearing wheel which is centrally received upon the transversely-extending shaft, and is provided with an actuating-spring, for backward movement, and which in the operation of printing is moved by successive steps, of equal or of unequal extent, from left to right, from end to end of its field of movement upon such shaft, and which upon reaching its limit, is retracted, at a single movement, to its original position at the left of the machine.

4. In a type-writing machine, a triangular serrated shaft, and a type-bearing wheel which has a central triangular open frame or hub which is adapted to the faces and angles of the triangular shaft, and which is provided with impelling and retracting mechanism, substantially as specified, whereby in the operation of printing, it is impelled, step by step, through varying distances, from one extremity to the other of its field of movement, and whereby, when a line has been printed, it is retracted, at a single movement, to its original position.

5. In a type-writing machine, a triangular shaft, which is provided with a type-bearing wheel which has a central, triangular, open frame or hub, each angle of which is formed with outwardly-extending parallel walls, in which is journaled an antifriction-roller; to facilitate the movement of the type-bearing wheel along the shaft.

6. In a type-writing machine, a transversely-extending triangular shaft which upon one of its angles is provided with serrations; in combination with a longitudinally-extending type-bearing wheel which, in the operation of the machine, engages the serrations upon the shaft, and in one direction is moved step by step across the machine, and which is provided with a coil-spring which when such step-by-step movement is completed, operates to retract such wheel, and to return it, by a single movement, to its original position.

7. In a type-writing machine, a transversely-extending triangular shaft which has rotative movement in a vertical plane; and a vertical, longitudinally-extending type-bearing wheel which is axially mounted upon the shaft, and which in one direction is, in the operation of the machine, movable step by step, through varying distances, from end to end of the shaft, and which, upon the completion of such step-by-step movement, is withdrawn, at a single movement, to its original position upon the shaft; in combination, substantially as described.

8. In a type-writing machine, a transversely-extending triangular shaft, which has along one of its angles a series of serrations, combined with a type-bearing wheel which is received upon such transversely-extending shaft, and which is provided with an antifriction-roller which has pinions, for engagement with the serrations upon the shaft.

9. In a type-writing machine, a transversely-extending triangular shaft which upon one of its angles is provided with a series of serrations; combined with a type-bearing wheel which is received upon such transversely-extending shaft, and which is provided with an antifriction-roller which is pinioned, and to the shaft of which is attached one extremity of a coiled retracting-spring.

10. In a type-writing machine, a transversely-extending triangular shaft which is supported in bearings at the sides of the machine, and which is provided in one of its journals with an obliquely-extending groove; combined with a movable arm $b^9$, which is provided with a pin which is in engagement with the groove, to cause rotative movement of the shaft.

11. In a type-writing machine, a transversely-extending rotative triangular serrated shaft; a vertical, longitudinally-extending, type-bearing wheel, which is provided with antifriction appliances, and with a retracting-spring which is centrally received upon the shaft, and which, in the operation of the machine, is movable step by step, through varying distances, in one direction, and by a single movement, in the opposite direction, from side to side of the machine; and mechanism upon the machine substantially as described, which operates in connection with the type-bearing wheel, to regulate and control the alinement of characters thereon; in combination.

12. In a type-writing machine, a serrated shaft which extends across the machine; and has rotative motion in bearings thereon; a vertically-arranged longitudinally-extending type-bearing serration-engaging wheel which is received upon the transverse shaft; and which in the operation of printing engages the serrations thereon and an arm which engages one of the vertical faces of the type-bearing wheel and is actuated by mechanism which is operated from the keyboard; to move the type-bearing wheel along the shaft from the left to the right extremity thereof, in combination.

13. In a type-writing machine, a serrated shaft which extends transversely of the machine, and has rotative motion in bearings thereon, and a vertically-arranged type-bearing shaft-engaging wheel, upon the transversely-extending shaft, in combination with a feed mechanism operative from the keyboard, which embraces two horizontal transversely-extending superposed ratchet-bars, and an arm the base of which is engaged by the ratchet-bars, and is in actuating engagement with the type-bearing wheel, to impel it from one side to the other of the machine; substantially as specified.

14. In a type-writing machine, a transversely-extending shaft which is provided with serrations, combined with a type-bearing wheel which embraces an interior portion or carrier, which engages the transversely-extending shaft for longitudinal movement thereon; and an encircling detachable rim or continuous tire, or type-carrying ring, which is interchangeable with one or more secondary rings which are of like dimensions with the first, but are provided with dissimilar characters; substantially as and for the purposes set forth.

15. In a type-writing machine, a transversely-extending supporting-shaft, combined with a type-bearing wheel upon the shaft, which embraces an interior shaft-engaging carrier, in the perimeter of which are notches, and a type rim or ring which is provided with interiorly-projecting lugs which are adapted to be received within the notches of the interior carrier.

16. In a type-writing machine, a type-bearing wheel in which are combined an interior carrier which has in its perimeter a series of notches, and which has in its outer periphery a continuous recess or encircling groove; and a type rim or ring which is adapted to be received upon the interior carrier, and which is provided with projecting lugs which are adapted to the notches and to the groove formed in the carrier.

17. In a type-writing machine a type-bearing wheel in which are combined an interior carrier which is provided with a series of notches, a peripheral groove, and a series of stops; and a type-rim or encircling ring which is received upon the interior carrier, and which is provided with a series of lugs which project inward, and are adapted to the notches, to the groove, and to the stops, of the carrier, substantially as shown and described.

18. In a type-writing machine, a type-bearing wheel which is provided with a detachable type rim or ring which upon its periphery is divided into equal segments of a circle, one of such segments being provided with assemblages or groups of two or of three letters each, which are located upon that portion of the segment which is first reached in the alinement; with assemblages of words or groups, each of which embraces three or four letters, which are placed in that portion of the segment which is next reached, in the alinement; with assemblages of words or groups of four letters or of five letters each, which occupy that portion of the segment which is next reached, in the alinement; and with words or other groups which are composed of five letters which are placed in that portion of the segment which is last reached in the alinement.

19. In a type-writing machine, a shaft which extends transversely of the machine, and has rotative motion in bearings thereon; and a vertically-arranged type-bearing wheel, upon the transversely-extending shaft; in combination with a feed mechanism which embraces two transversely-extending superposed ratchet-bars, the lower bar being fixed, and the upper bar having only a vibratory or intermittent left-and-right motion controllable to move through different distances; and an arm, the base of which is provided with a pawl, for engagement with the ratchet of the feed mechanism, and the body of which is in engagement with the type-bearing wheel, to move it from left to right along the transversely-extending shaft; substantially as specified.

20. In a type-writing machine a rotative shaft which extends from side to side of the machine; a type-bearing wheel, which is mounted upon the rotative shaft, and has sidewise movement along the same, from end to end thereof; and a feed mechanism substantially as specified, which engages the type-bearing wheel, and which is operative from the keyboard, to impart to a ratchet-bar of such feed mechanism, a movement equal in extent to either one, two, three, four, five, or six letter-spaces; in combination, substantially as and for the purposes set forth.

21. In a type-writing machine, a type-bearing wheel which upon its periphery is divided into equal segments of a circle, one of such segments being provided with assemblages of words, or of portions of words, of two or more letters, and a feed mechanism which is operated by rotation of the shaft upon which the type-wheel is supported, to produce spacing equal to the width required for the proper placing of two or more of the letters which are to be impressed.

22. In a type-writing machine, a rotative shaft which extends from side to side of the machine; and a type-bearing wheel which is mounted upon the rotative shaft, which has sidewise movement along such shaft, from end to end thereof, and which is provided with an interior retracting-spring; combined with mechanism, substantially as described, which is operable from the keyboard, whereby the retracting-spring is released from restraint, and the type-bearing wheel, whatever its position upon the shaft may be, is instantly returned to its position at the extreme left of the same; substantially as described.

23. In a type-writing machine, a triangular rotative shaft which extends transversely of the machine; a vertically-arranged type-bearing wheel which is mounted upon the triangular rotative shaft, and which is movable in either direction along the same; and a platen which is mounted in pivoted vertical bearings, and which extends across the machine at its rear, in a plane parallel to the plane of the rotative shaft; in combination with mechanism which embraces a pivoted rocker, and a ratchet attachment, which is actuated from the keyboard, and which operates to impart to the shaft and its type-bearing wheel, a backward movement upon their common axis, through an arc equal in extent to one-third of a complete revolution; essentially as described and shown.

24. In a type-writing machine, a triangular rotative shaft which extends transversely of the machine; a vertically-arranged type-bearing wheel which has a triangular or three-part hub by which it is mounted upon the triangular rotative shaft, and which is movable in either direction along the same—that is to say, toward the right, step by step, as a line is being printed, and in the opposite direction, by a single movement, upon the completion of the line; and a platen which is mounted in pivoted vertical bearings, and which extends across the machine at its rear, in a plane parallel to the plane of the rotative shaft; in combination with mechanism which embraces a pivoted rocker and a ratchet attachment, which is actuated from the keyboard, and which operates to impart to the shaft and its type-bearing wheel, a backward movement upon their common axis, through an arc equal in extent to one-third of a complete revolution.

25. In a type-writing machine, a rotative shaft which extends transversely of the machine; a type-bearing wheel which is mounted upon the rotative shaft, and which is provided with distinct peripheral, segmental groups of characters; and a platen which extends across the machine in a plane parallel with the rotative shaft; combined with mechanism embracing a pivoted rocker, and a ratchet attachment, which is actuated from the keyboard, and which operates to impart to the shaft and its type-bearing wheel, a forward movement upon their common axis, through an arc equal to one hundred and twenty degrees, thereby changing the series of characters which are to be employed; substantially as shown and set forth.

26. In a type-writing machine, a triangular rotative serrated shaft which extends transversely of the machine, from side to side thereof; a type-bearing wheel which is mounted upon the rotative shaft, which is adapted to the serrations thereof, which has sidewise movement thereon, and which is provided with distinct peripheral segmental groups of characters; and a platen which extends across the machine, at the rear thereof, in a plane parallel with the rotative shaft; in combination with mechanism consisting of two independent sets or series of levers, rods, plates, and bearings, each separately actuated from the keyboard, whereby the rotative shaft, and its type-bearing wheel are caused to be moved from their operative position, either backward or forward, through a vertical plane equal to one-third of a circle, for the purpose of changing the series of characters to be imprinted upon the sheets; substantially as described and shown.

27. In a type-writing machine, a triangular rotative shaft which extends transversely of the machine; a type-bearing wheel which is mounted upon the rotative shaft, which is provided with distinct peripheral segmental groups or fields of characters, and which in printing engages the body of the rotative shaft, and moves by successive steps, of variable extent, along the same; and a platen which extends across the machine; in a plane parallel with the wheel-bearing shaft; in combination with a series of key-levers the extent of movement of each of which is exactly sufficient to bring into alinement, in coincidence with the platen, the particular character or assemblage of characters which such key controls upon that segmental portion of the type-bearing wheel which is presented to such platen; substantially as shown and described.

28. In a type-writing machine, a triangular, serrated, rotative shaft which extends transversely of the machine; a type-bearing wheel which is mounted upon the rotative shaft and is adapted to the faces thereof, which is provided with distinct peripheral, segmental groups or fields of characters, and which in printing engages the serrations in the body of the rotative shaft, and moves by successive steps of either equal or variable extent, along the same; and a platen which extends across the machine at its rear, in a plane parallel with the wheel-bearing shaft; in combination with a series of key-levers the extent of movement of each of which is exactly sufficient to bring into alinement, in coincidence with the platen, the particular character or assemblage of characters which such key controls upon that segmental portion of the type-bearing wheel which is presented to such platen; substantially as shown and set forth.

29. In a type-writing machine, a transversely-extending rotative shaft, and a type-bearing wheel, which is provided with distinct segmental, peripheral groups or series of characters, and which is mounted upon such rotative shaft; in combination with a platen which is journaled in bearings which are provided in the upper extremity of vertically-arranged rockers which have movement longitudinally of the machine, whereby the platen is brought into or out of operative relation with the type-bearing wheel, substantially as specified.

30. In a type-writing machine, a longitudinally-extending laterally-movable type-bearing wheel; combined with a platen which is rotatively mounted in bearings in the upper extremity of coincident vertical standards which are pivoted at their lower extremity, at the base of the machine, and which is provided with an end ratchet, and with an adjustable shifting rod, whereby in connection with mechanism which is operative from the keyboard, a rotative movement is imparted to the plate, corresponding either to one or to two of the notch-spaces of the end ratchet.

31. In a type-writing machine, a platen which is provided with end serrations and which is rotatively mounted in vertical rotative standards; and a shifting rod which is mounted upon such rotative standards, and which is pivotally seated upon a stop which is so adjustable, vertically or horizontally upon the standards that the rotative movement of the platen shall correspond either to two, or to but one of the notch-spaces; in combination; substantially as shown and specified.

32. In a type-writing machine, a rotative shaft which at one extremity is provided with a fixed laterally-projecting arm or lever, which upon one side is provided with a roller; a rod which connects the extremities of the alinement-lever with the pivoted standards; a rod which connects the lever upon the rotative shaft, with the lever upon the extremity of the alinement-bar; and mechanism which is operative by each impression-key in the keyboard; in combination; whereby alinement is secured and whereby it is maintained, while the platen is moved to the type-bearing wheel, to make an impression.

33. In a type-writing machine, a rotative shaft which at one extremity is provided with a laterally-projecting arm or lever, and which carries a type-bearing wheel; a platen, which is parallel with the rotative shaft, and which is mounted in bearings upon pivoted vertical standards; a supporting-bar which extends transversely of the frame of the machine in a plane parallel to the rotative shaft; an alinement lever or bar which has rotative movement in arms of the supporting-bar, and which at one extremity is provided with a laterally-extending arm or lever; a rod which connects the extremity of the alinement-lever with the pivoted standards which support the platen; and a rod which connects the lever upon the rotative shaft with the arm upon the alinement-lever, combined with independent mechanisms, each operated by an impression-key in the keyboard, whereby alinement is produced, and whereby when produced it is maintained, while the platen is moved forward, upon its pivoted standards, to make impression.

34. In a type-writing machine, a supporting-arm which projects forward from the inner face of the rear wall of the machine; a ribbon-lever which at its mid-length is pivoted upon the supporting-arm of the ratchet-wheels which are received by their end journals in the outer extremities of the ribbon-lever, and are each provided with an outwardly-projecting spindle; pawls upon an arm of the machine, for engagment with each ratchet-wheel, a ribbon-reel upon the outwardly-projecting spindle of each ratchet-wheel; a guide which projects outwardly from the wall or frame of the machine, above the ribbon-lever; a pivoted spring-controlled lever, upon each face of the frame of the machine, provided with a vertical slot, and an inking-ribbon which is received upon the reel, which is extended over the guide or roller, through the vertical slot in the spring-controlled lever; and which is extended across the machine, and is received upon the spring-controlled lever, the guide, and the reel, upon the opposite side of the machine; in combination, substantially as and for the purposes specified.

35. In a type-writing machine, a supporting-arm which projects horizontally forward from the rear wall of the machine; a ribbon-lever which at its mid-length is pivotally received upon the supporting-arm; a ratchet-wheel which by its journal or shaft is revolubly received within a longitudinal bearing formed in each extremity of the centrally-pivoted ribbon-lever, and which is provided with an outwardly-projecting spindle; a pawl upon the arm of the machine, in coincidence with each ratchet-wheel, a ribbon-reel which is received upon the outwardly-projecting spindle of each ratchet-wheel; a guide-roller, above the ribbon-reel, which projects outwardly from the body of the machine; and a pivoted, spring-controlled arm or lever, mounted longitudinally upon the machine, and provided in its rear extremity with a vertical transverse slot; combined as set forth; the ribbon-lever being in such adjustment with the ratchet-wheels that when one of them is in engagement with its pawl, the other is not in engagement, whereby the ribbon, wound upon each reel, and extending intermediately, over the guide-rollers, and the spring-controlled arms, is wholly transferred to the reel the ratchet-wheel of which is engaged by its pawl.

36. In a type-writing machine, a ribbon mechanism which embraces opposite alternately-operating ratchet-wheels, and inking-reels; and a ribbon which is secured by its opposite ends to the opposite reels, and which operates in the manner described, when the ribbon has been transferred from one reel to the other, to lift one end of the reel-bearing lever, change the engagement of the ratchet-wheels, reverse the operation of the ribbon-feed, and automatically return the ribbon to the reel from which it was transferred.

37. A type-writing machine in which are combined a rotative platen which is mounted on pivoted rockers; a centrally-pivoted transversely-extending supporting-lever; oppositely-placed ratchet-wheels; and a ribbon mechanism which embraces ribbon-reels and ribbon-bearings which are provided with two separate and distinct ribbons, one of which is arranged directly above the other; and a ribbon-elevating mechanism which is adapted, substantially as described, to elevate the ribbons to different planes; whereby, at the will of the operator, matter may be printed in different colors, or in different shades of the same color; essentially as set forth.

38. In a type-writing machine, a transversely-extending lever which at its mid-length is pivoted upon the rear wall of the machine; a ratchet-wheel, upon each extremity of the pivoted lever; a pawl, operating in connection with each ratchet-wheel; a ribbon-reel, coincident with each of the two ratchet-wheels; a guide-roller, in coincidence with the ratchet-wheels and with the ribbon-reels; a longitudinally-extending pivoted arm, in coincidence with the wheels, the reels, and the guide-rollers; and a ribbon which is received by the reels, and which intermediately extends through a vertical slot in the rear extremity of each pivoted arm; combined as set forth, with lateral connecting-rods which impart movement to the platen; whereby the ribbon is transferred, alternately, from one of the reels to the other, and whereby it is made adjustable, in a vertical plane, at different elevations; substantially as and for the purposes specified.

39. In a type-writing machine, an appliance for using printers' ink, which embraces a bearing-rod which extends horizontally across the machine; an ink-receptacle and a transferring-roller, which together are mounted upon the horizontal bearing-rod, the transferring or distributing roller being flanged, to embrace the type-wheel and give sidewise movement of the inking appliance upon the horizontal bearing-rod, the ink-receptacle being provided with perforations, and with means for expelling the ink therethrough, and the roller being in coincidence with the perforations in the receptacle, and operating to spread the ink upon the face of the type; substantially as and for the purposes described.

40. In a type-writing machine, a transversely-extending rotative shaft; a longitudinally-extending vertically-arranged type-bearing wheel, which is centrally received upon the rotative shaft, and which has rotation therewith, and sidewise movement thereon; a transverse rod or shaft which is mounted upon the machine, parallel with the rotative shaft; a perforated ink-receptacle which is mounted upon the transverse rod or shaft, and which contains printers' or other thick ink, under pressure; and a distributing-roller, upon the rod or shaft, which is provided with side flanges, to embrace the type-bearing wheel, and which is pivoted in coincidence with the perforations in the ink-receptacle, to receive the contents thereof, and to transfer them to the characters upon the type-bearing wheel; in combination.

41. In a type-writing machine, a revoluble shaft which is mounted in bearings at the rear of the machine, and in operative relation with the platen, and which is adapted to receive a continuous roll of paper, in combination with a paper-covered roller, which is mounted in outer bearings in swinging arms which are pivoted concentrically with the platen; whereby the printed but unseparated sheets are extended over the surface of the platen and are wound upon the paper-covered roller, the revolution of the paper-roll, as the web is drawn to the platen, serving to wind the web, as it is printed, upon the secondary paper-roller, substantially as described.

42. In a type-writing machine a vertically and longitudinally arranged type-bearing wheel, which is operated from the keyboard, and a shifting mechanism which ordinarily is operated to bring first into alinement the first member of a segmental series of letters or characters, but which is susceptible of such adjustment that when certain keys in the board are in their normal position, any letter upon the wheel may be put in alinement; whereby, at the convenience of the operator, the writing may be produced in cipher; substantially as described.

43. In a type-writing machine, a vertically and longitudinally arranged type-bearing wheel which is operated from the keyboard and a shifting mechanism which ordinarily is operated to bring first into alinement the first member of any of several segmental series of letters or characters and which is additionally susceptible of such adjustment that when certain keys are in their normal position, letters other than the first may be put in alinement, thereby producing matter in cipher; and which is susceptible also of readjustment, so that in copying the cipher under the ordinary manipulation of the machine, first above indicated, translation of such cipher will be produced; substantially as specified.

44. In a type-writing machine a vertically and longitudinally arranged type-bearing wheel, which is operated from the keyboard and a shifting mechanism which embraces a clutch which ordinarily is operated to bring first into alinement the first member of a segmental series of letters or characters, but which is susceptible of such adjustment that when certain keys in the board are in their normal position, any letter upon the wheel may be put in alinement; whereby, at the convenience of the operator, the writing may be produced in cipher; substantially as described.

45. In a type-writing machine a vertically and longitudinally arranged type-bearing wheel, which is operated from the keyboard, and a shifting mechanism which embraces a clutch which ordinarily is operated to bring first into alinement the first member of any of several segmental series of letters or characters and which is additionally susceptible of such adjustment that when certain keys are in their normal position, letters other than the first may be put in alinement, thereby producing matter in cipher; and which is susceptible also of readjustment so that in copying the cipher under the ordinary manipulation of the machine, first above indicated, translation of such cipher will be produced; substantially as specified.

46. In a type-writing machine, a rotative shaft upon which is received a type-bearing wheel; and in one extremity of which is provided an obliquely-extending groove; and a longitudinal pin, within the cavity of the shaft, actuated by mechanism which is operated by a key in the keyboard; the pin being provided with an adjustable clutch, and suitable connections whereby the rotative movement of the shaft is exactly proportioned to the depth of the engagement of the pin with the oblique groove or passage; in combination, substantially as set forth.

47. In a type-writing machine, the combination of a rotative shaft; a type-wheel which is mounted upon such rotative shaft, and is movable longitudinally thereon; and a type-bearing rim which is carried by and is circumferentially adjustable upon such type-wheel; whereby the characters upon the rim are made adjustable in a circular plane, independently of the rotative shaft.

48. In a type-writing machine, a rotative shaft; a type-wheel which is mounted upon the rotative shaft, and is movable longitudinally thereof; and a type-bearing rim which is carried by and is circumferentially adjustable upon such type-wheel; in combination with a keyboard, and with connecting mechanism between the keyboard and the rotative shaft, whereby the shaft and the type-wheel are rotated to bring to the printing-point the characters which correspond with the key-stem.

49. A type-writing machine in which the type-wheel-supporting shaft, and the type-wheel upon such shaft, are either separately or together, capable of adjustment in a circular plane, whereby any character upon the type-wheel may be put into alinement independently of the operation of any of the keys in the keyboard of such machine.

50. A type-writing machine in which are combined a rotatively-adjustable type-wheel-supporting shaft, and a type-wheel which is independently rotatively adjustable upon such supporting-shaft, in which the supporting-shaft alone or the exterior portion of the type-wheel alone, or both the shaft and the exterior portion of the wheel together, may be given definite, variously-restricted rotation, either forward or backward upon their common axis; and in which either may be rotated in one direction, and the other in the opposite direction; whereby any character upon the type-wheel may, by any one of the adjustments of the shaft or of the wheel, be put into alinement, independently of the operation of any of the keys in the keyboard of the machine.

51. In a type-writing machine, a type-wheel which is provided with an interior carrier, and with a circumferentially-adjustable encircling type-rim, which, upon each adjustment, is engageable by the interior carrier.

52. In a type-writing machine, a type-wheel which embraces an encircling circumferentially-adjustable type-rim which is provided interiorly with graduated engageable surfaces which correspond with the exterior types; and an inclosed circular carrier which is adapted, upon each adjustment of the circumferentially-movable type-rim to engage the graduations therein and thereby secure it in its adjustment.

53. In combination with a type-ring bearing printing-characters, and with a sustaining disk or body for said ring, capable of conjoint and of independent movement about their common axis, a series of key-levers, and intermediate connections between the key-levers and the type-ring, whereby the actuation of any lever of the series is caused to bring to the printing-point the corresponding printing-character; and means for moving the printing-ring or the supporting-disk one relatively to the other, and for locking them in any desired relation, whereby each key-lever may be caused to bring to the printing-point a character other than that corresponding to such lever under normal adjustment.

HOWELL W. SOUDER.

Witnesses:
FRANK SOWERS,
CHARLES D. BAILY.